United States Patent [19]

Huot et al.

[11] Patent Number: 5,731,834
[45] Date of Patent: Mar. 24, 1998

[54] REPLACEABLE CCD ARRAY AND METHOD OF ASSEMBLY

[75] Inventors: Robert Donald Huot, Pittsford; Rocco Menaguale, Fairport; Robert Edward Ashe, Henrietta; Charles John Moriarty, Rochester, all of N.Y.

[73] Assignee: Eastman Kodak Company, Rochester, N.Y.

[21] Appl. No.: 486,306

[22] Filed: Jun. 7, 1995

[51] Int. Cl.$^6$ .................................................. H04N 3/14
[52] U.S. Cl. .................................... 348/374; 348/340
[58] Field of Search ................................. 348/373, 374, 348/340, 335

[56] References Cited

U.S. PATENT DOCUMENTS

| | | | |
|---|---|---|---|
| 4,134,129 | 1/1979 | Filipovich | 348/335 |
| 4,385,325 | 5/1983 | Chen | 358/483 |
| 4,594,613 | 6/1986 | Shinbori et al. | 348/374 |
| 4,734,778 | 3/1988 | Kobayashi | 348/335 |
| 4,803,557 | 2/1989 | Bridges | 348/374 |
| 4,830,985 | 5/1989 | Araghi et al. | 437/209 |
| 5,032,898 | 7/1991 | Bowen et al. | 257/433 |
| 5,047,835 | 9/1991 | Chang | 257/433 |
| 5,097,274 | 3/1992 | Drake et al. | 347/42 |
| 5,140,150 | 8/1992 | Cosijn | 257/231 |
| 5,291,010 | 3/1994 | Tsuji | 250/208.1 |

*Primary Examiner*—Wendy Garber
*Attorney, Agent, or Firm*—Christopher J. Fildes

[57] ABSTRACT

A CCD array assembly for use in a scanner, includes a CCD array optically aligned relative to a CCD array nest and affixed thereto to form a replaceable subassembly. The CCD array nest has an outwardly facing statically determinate or exactly constrained interface mounting surface. A carrier plate with the CCD array assembly removably attached thereto is optically aligned and affixed to a barrel frame and lens assembly. The subassembly is removably attachable to the carrier plate allowing replacement of a failed CCD array without additional alignment.

9 Claims, 4 Drawing Sheets

REPLACEABLE CCD ARRAY AND METHOD OF ASSEMBLY

FIELD OF THE INVENTION

This invention relates to linear arrays in optical scanners and methods of assembly and more particularly to a CCD array assembly permitting the economical, precision replacement of the linear array in the assembly without additional alignment.

BACKGROUND OF THE INVENTION

Conventional alignment of CCD arrays is done in a variety of ways depending on the application. In precise applications such as a photo CD scanner, an active alignment is required wherein the output of the CCD array is monitored while the location of the CCD array is adjusted. Once in the correct position, the CCD array is fixed in place. This approach produces very accurate results but is also time consuming and requires the scanner to be brought to a repair facility having very expensive fixtures for accomplishing any replacement of a failed CCD array.

SUMMARY OF THE INVENTION

The present invention provides a CCD array assembly that makes it possible to economically replace a linear array in an optical system and maintain critical alignments necessary for good image quality without requiring active alignment of the CCD array during the replacement. Accordingly, the assembly includes pre-aligned components having exactly constrained interfaces. With an exactly constrained interface, there are mounting features determined such that the X, Y, and Z positions and the three rotational positions of an object are clearly defined by these features, and only these features. Exactly constrained interfaces are also statically determinate interfaces. The components are fastenable together relative to the exactly constrained interfaces providing an aligned assembly having parts that are interchangeable. These parts can be changed without having to actively align the components.

More specifically, the CCD array is precisely located in a CCD array nest having a statically determinate interface through the use of a precision fixture which optically locates the CCD array with respect to the interface. The CCD array and the CCD array nest form a subassembly which is bonded together. The subassembly is located by the exactly constrained interface to a carrier plate and attached by screws. This carrier plate assembly is optically aligned by another precision fixture to the system optics. The CCD array and a CCD array nest subassembly can be removed and replaced in the CCD array assembly without additional alignment.

Accordingly, the CCD array assembly includes a CCD array nest having a statically determinate mounting interface bonded to the CCD array such that the CCD array is precisely aligned relative to the CCD array nest. The statically determinate interface includes two spaced nest locators and three spaced raised surfaces collectively defining a mounting plane. Apertures extend through the raised surfaces defining the mounting plane. The carrier plate has first and second sides and includes locator receivers cooperably disposed for engaging the array nest locators. The carrier plate also has threaded apertures corresponding to the apertures in the CCD array nest. It should be noted that other exactly constrained interfaces can be utilized.

A barrel frame and lens assembly is precisely aligned relative to the carrier plate assembly through the use of another precision fixture and the carrier plate is bonded to the barrel frame such that the CCD array is optically aligned for optimal performance of the CCD array. If the CCD array fails, the CCD array and CCD array nest are removable from the carrier plate via the screws which attach the subassembly to the carrier plate and a new subassembly can be installed without additional alignment.

These and other features and advantages of the invention will be more fully understood from the following detailed description of the invention taken together with the accompanying drawings.

DETAILED DESCRIPTION OF THE INVENTION

Figure 1:
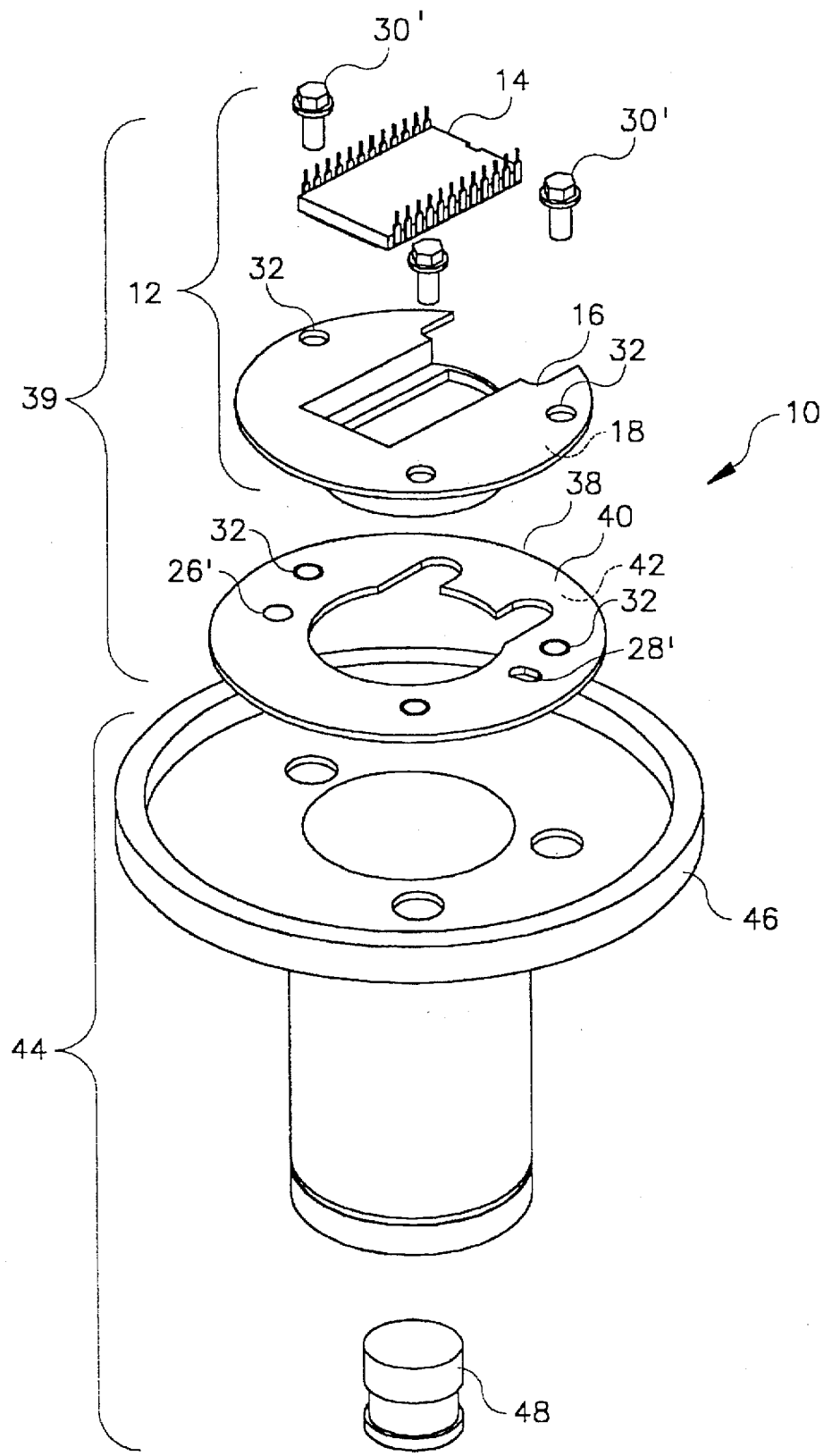
FIG. 1 is a perspective exploded view of a CCD array assembly constructed in accordance with the present invention.
Figure 2:
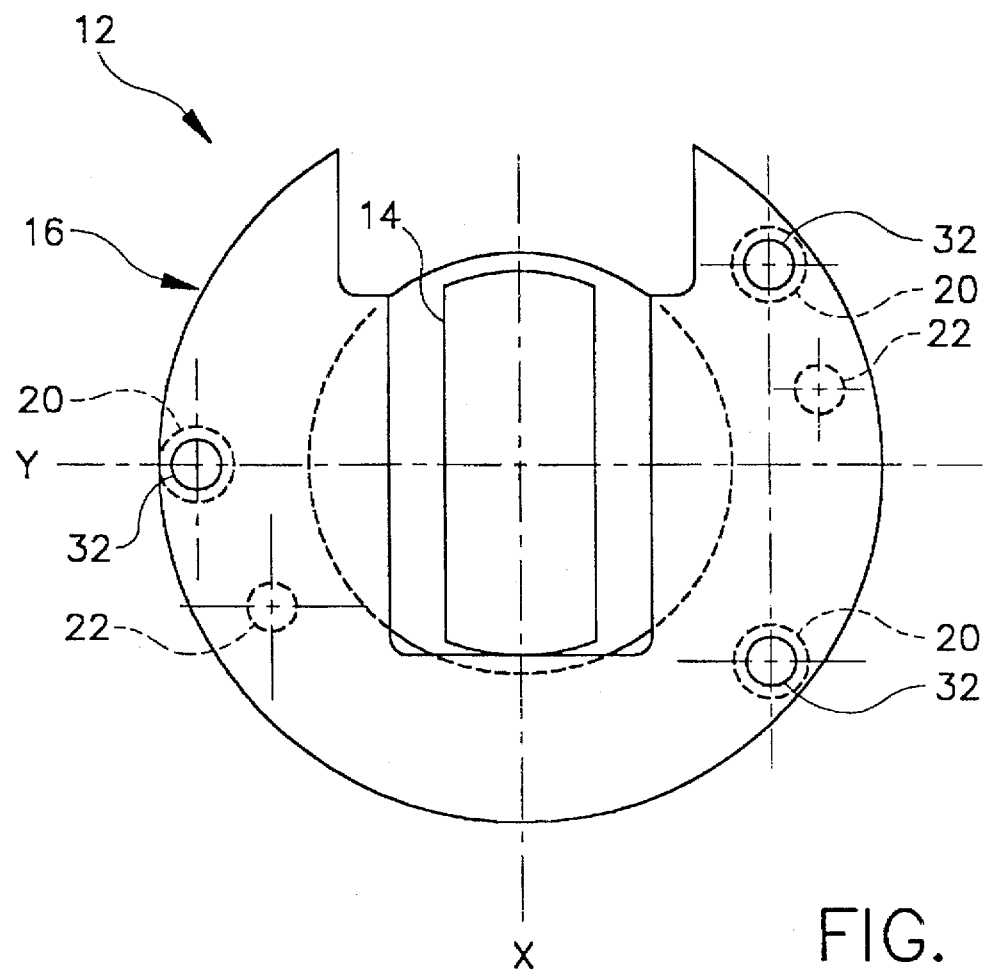
FIG. 2 is a plan view of a CCD array nest.
Figure 3:
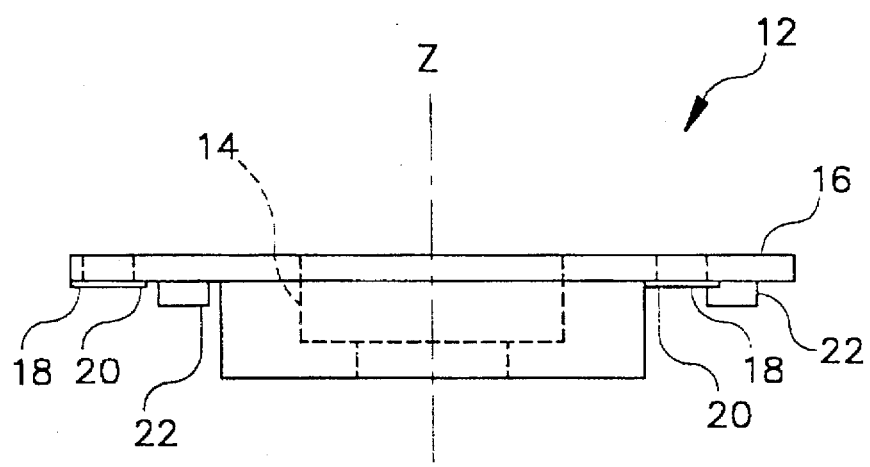
FIG. 3 is a side elevational view of the CCD array nest of FIG. 2.

Referring now to the drawings in detail, numeral 10 generally indicates a CCD array assembly having a replaceable subassembly 12 comprised of a CCD array 14 and CCD array nest 16. As is hereinafter more fully described, the subassembly 12 can be replaced in the assembly 10 without additional alignment.

Figure 4:
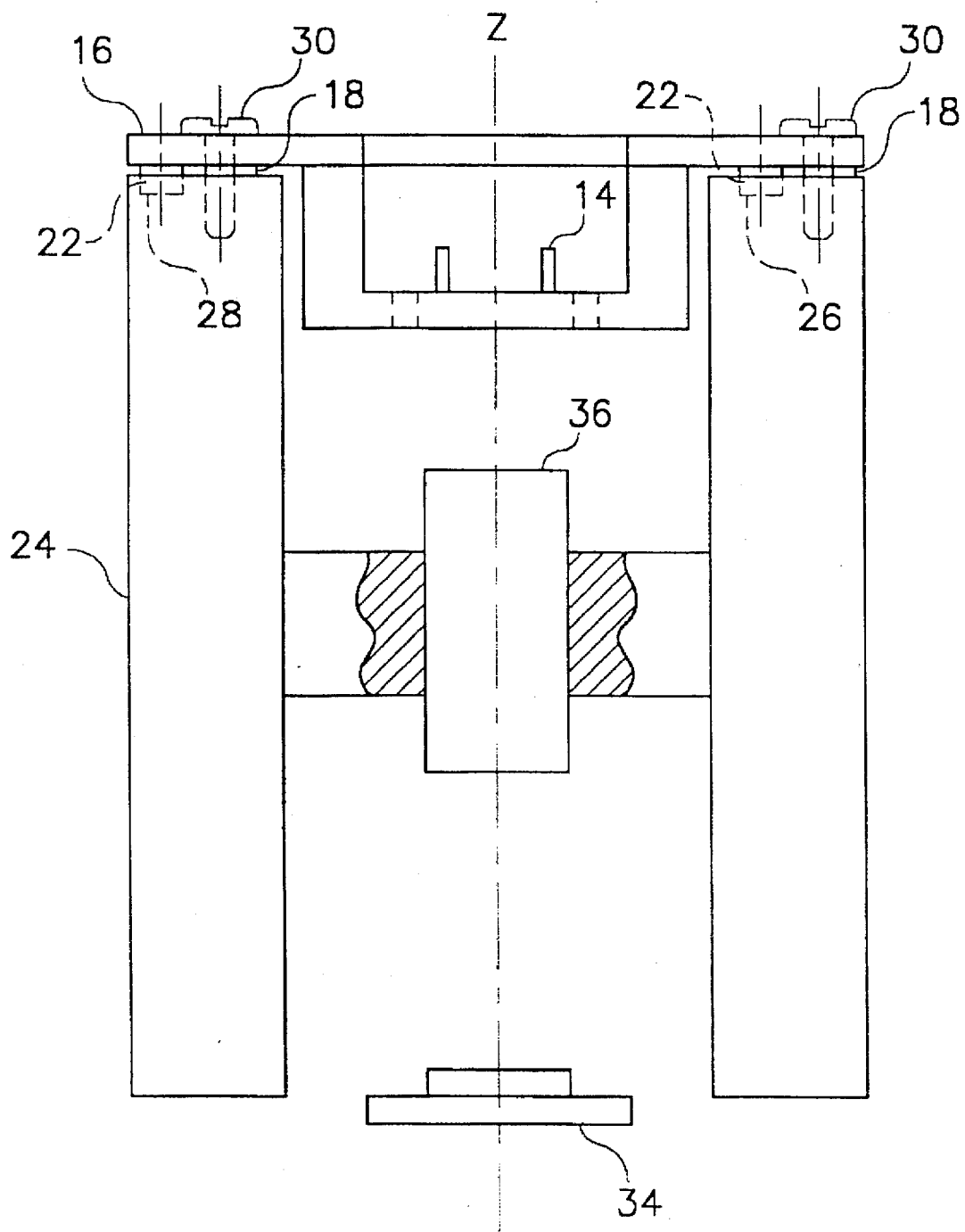
FIG. 4 is a sectional elevational view of a precision fixture illustrating the optical alignment of the CCD array in the CCD array nest.

With reference to FIGS. 1–4, the CCD array nest 16 includes a statically determinate interface 18 defined in part by three generally concentrically disposed raised surfaces or pads 20 which define a mounting plane. The statically determinate interface 18 also includes two generally diametrically opposed array nest locators or pins 22 used to locate the CCD array nest 16 first in a fixture 24, as illustrated in FIG. 4 and subsequently in the assembly 10, as hereinafter more fully described.

With continued reference to FIG. 4, the three pads 20 locate the CCD array nest 16 in the Z direction. The two pins 22 interface with a hole 26 and slot 28 in fixture 24, locating the CCD array nest 16 in the X and Y directions and with respect to rotation around the Z axis. The CCD array nest 16 is held in place on the fixture 24 with screws 30 extending through apertures 32 in the center of each pad 20.

The CCD array 14 is optically aligned relative to the CCD array nest 16 and thereby relative to the statically determinate interface 18, by processing information received from an illuminated target 34 through a lens assembly 36 mounted on the fixture 24. The output of the CCD array 14 is processed and the information from it used to align the CCD array in all degrees of freedom for optimal performance. That alignment is achieved by holding the CCD with a fixture that has precision micrometer adjustments to move the CCD in all six degrees of freedom: X, Y, Z, rotation around X, around Y, around Z. For example, the principles used in the precision position controls that position a work piece in a machine tool can be utilized in the CCD holding fixture. Once the CCD array 14 is in a position providing optimal performance, the CCD array is bonded to the CCD array nest 16 with an adhesive. With such an alignment procedure, it becomes apparent that no precision is required of the CCD array nest 16. Therefore, part cost is reduced and performance is no longer dependent on part tolerance. Higher optimal performance is achieved in this manner.

Figure 5:
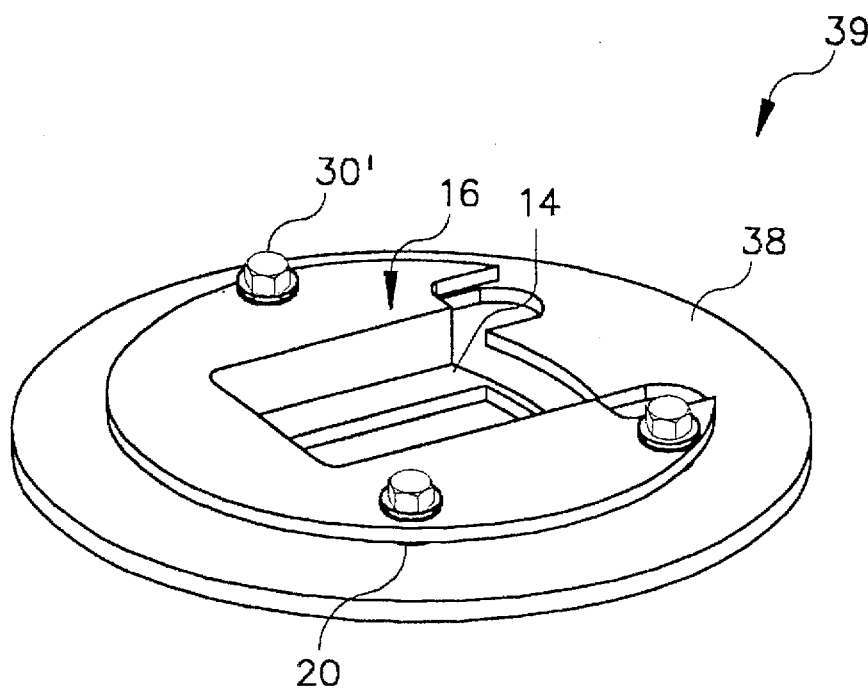
FIG. 5 is a perspective view of a carrier plate assembly comprising the CCD array, CCD array nest, and a carrier plate.
Figure 6:
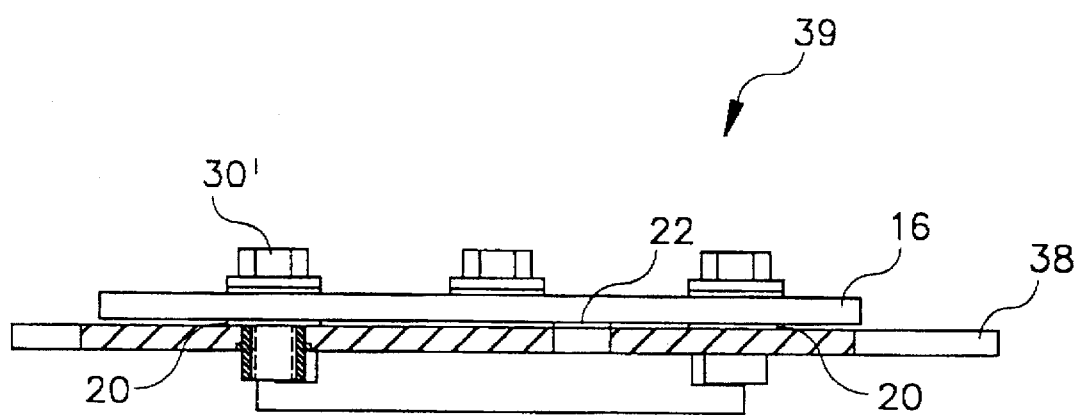
FIG. 6 is a side elevational view of the subassembly and carrier plate comprising the carrier plate assembly of FIG. 5 illustrating the mounting arrangement.

Referring again to FIG. 1, and with reference to FIGS. 5 and 6, the CCD array assembly 10 includes a carrier plate 38 having first and second sides 40, 42 respectively. The first side 40 engages the statically determinate interface 18 of the replaceable subassembly 12 and includes locator receivers defined by a hole 26' and slot 28' cooperably disposed for engaging pins 22. The first side 40 thereby provides a corresponding interface for receiving the array nest 16 as that of fixture 24. Screws 30' are used to attach the subassembly 12 to the carrier plate 38 forming a carrier plate assembly 39.

The carrier plate 38 with the attached subassembly 12 is bonded by the second side 42 to a barrel frame and lens assembly 44 after alignment as hereinbelow described to complete the CCD array assembly 10. The barrel frame and lens assembly 44 includes a barrel frame 46 and a lens 48 aligned by precision fixturing, not shown. The alignment of the barrel frame 46 and lens 48 can be preserved at this point in the process by bonding together with an adhesive. Alternatively, the alignment can be fixed after several more steps. By fixing the barrel frame 46 and lens 48 in connection with alignment of the carrier plate 38 and subassembly 12, the flexibility of adjusting the magnification of the optical system is achieved. This alignment is accomplished in an iterative manner.

In like manner, as the hereinabove described optical alignment procedure preceding the bonding of the CCD array 14 and array nest 16, the subassembly 12 and the carrier plate 38 are mounted in another fixture, not shown, and the barrel frame and lens assembly 44 is secured in yet another fixture, not shown, that has an illuminated target.

The subassembly 12 and carrier plate 38 are moved in a precise manner relative to the barrel frame and lens assembly 44 to achieve proper alignment. The output of the CCD array 14 is processed and the information from it used to align the carrier plate and CCD array subassembly 12 in all degrees of freedom for optimal performance. Once the subassembly 12 and carrier plate 38 are in a position of optimal performance of the CCD array 14, the second side 42 of the carrier plate 38 is bonded to the barrel frame and lens assembly 44 by an adhesive.

If the barrel frame 46 has not been previously bonded to adjust for magnification, it could be bonded at this point. If the magnification does not meet the requirements, the lens 48 can be moved axially to change the magnification and the alignment process repeated. This would be an iterative process that may have to be repeated until the magnification meets the requirements of the scanner.

If the CCD array 14 fails in use, the subassembly 12 consisting of the CCD array 14 and array nest 16 is removable from the carrier plate 38 by unfastening screws 30' and removing the subassembly 12 from the carrier plate assembly 39. A new subassembly 12 is replaceable on the carrier plate 38, and without any active optical alignment, the alignment of the subassembly 12 is maintained through the statically determinate interface 18 engagement with the carrier plate.

The terms "optical alignment", "optically aligned" and "optically located" as used herein and in the following claims refer to the previously described methods of alignment of the CCD array 14 with the nest 16 and the carrier plate assembly 39 with the barrel frame and lens assembly 44 by positioning the CCD array 14 or carrier plate assembly 39 for optimal performance of the CCD array by processing information received from an illuminated target through a lens in a fixture or in the barrel frame and lens assembly.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

Parts List

10. CCD array assembly
12. subassembly
14. CCD array
16. CCD array nest
18. interface
20. pads
22. pins
24. fixture
26. hole
26'. hole
28. slot
28'. slot
30. screws
30'. screws
32. apertures
34. target
36. fixture lens assembly
38. carrier plate
39. carrier plate assembly
40. first side
42. second side
44. assembly
46. barrel frame
48. lens

What is claimed is:

1. A method of assembling a CCD array assembly for use in a scanner, the method characterized by the steps of:

optically aligning a CCD array relative to a CCD array nest for optimal performance of said CCD array; said CCD array nest having an outwardly facing statically determinate mounting interface including three spaced raised surfaces collectively defining a mounting plane; said CCD array nest also having two spaced nest locators;

permanently affixing said CCD array to said CCD array nest to form a subassembly;

interfacing said statically determinate interface to a carrier plate;

removably attaching said statically determinate interface to said carrier plate to form a separable carrier plate assembly;

aligning a barrel frame relative to a lens;

affixing said barrel frame and lens assembly;

aligning said carrier plate assembly relative to said barrel frame and lens assembly for optimal performance of said CCD array; and permanently affixing the carrier plate of said carrier plate assembly to said barrel frame and lens assembly while maintaining alignment of said carrier plate assembly with said barrel frame and lens assembly;

whereby said nest and affixed CCD array subassembly may be replaced on the carrier plate with an identical subassembly without requiring further alignment.

2. The method of claim 1 wherein the step of aligning said CCD array relative to said CCD array nest is characterized by:

constraining said array nest by said statically determinate interface surface in a precision fixture; and moving said CCD array in response to an illuminated target to align the CCD array for optimal performance.

3. The method of claim 2 wherein the step of attaching said interface to said carrier plate is characterized by:

applying removable fasteners.

4. The method of claim 3 wherein the step of aligning said carrier plate assembly relative to said barrel frame and lens assembly is characterized by:

constraining said barrel frame and lens assembly in a precision fixture having an illuminated target; and aligning said carrier plate assembly for optimal performance of said CCD array.

5. A method of assembling a CCD array assembly for use in a scanner, the method characterized by the steps of:

optically aligning a CCD array relative to a CCD array nest for optimal performance of said CCD array; said CCD array nest having an outwardly facing statically determinate mounting interface including three spaced raised surfaces collectively defining a mounting plane; said CCD array nest also having two spaced nest locators;

permanently affixing said CCD array to said CCD array nest to form a subassembly;

interfacing said statically determinate interface to a carrier plate;

removably attaching said statically determinate interface to said carrier plate to form a separable carrier plate assembly;

aligning a barrel frame relative to a lens;

optically aligning said carrier plate assembly relative to said barrel frame and lens for optimal performance of said CCD array;

iteratively adjusting the magnification of the optical system by moving the lens axially in the barrel frame and going through the alignment process iteratively until the desired magnification is required;

affixing said barrel frame and lens to form an assembly; and permanently affixing the carrier plate of said carrier plate assembly to said barrel frame and lens assembly while maintaining alignment of the carrier plate assembly with the barrel frame and lens assembly;

whereby said nest and affixed CCD array subassembly may be replaced on the carrier plate with an identical subassembly without requiring further alignment.

6. A replaceable CCD array subassembly for use in a scanner including a CCD array and barrel frame and lens assembly characterized by:

a CCD array nest having a statically determinate mounting interface including three spaced surfaces collectively defining a mounting plane, said CCD array being optically aligned and permanently affixed to said CCD array nest such that said CCD array is precisely aligned relative to said statically determinate mounting surface of the CCD array nest for optimal performance.

7. The CCD array subassembly of claim 6 characterized in that said statically determinate interface includes two spaced nest locators.

8. The CCD array subassembly of claim 7 characterized in that said spaced surfaces include apertures extending through said array nest.

9. The CCD array subassembly of claim 8 in combination with a barrel frame and lens assembly characterized by:

a carrier plate having first and second sides; said first side engaging said three spaced surfaces and having first and second locator receivers cooperably engaging said array nest locators; said carrier plate also having apertures corresponding to said apertures in said CCD array nest and receiving fasteners removably mounting said nest to the carrier plate;

said barrel frame affixed to said lens such that said lens is precisely aligned relative to said barrel frame;

said carrier plate being permanently affixed by its second side to said barrel frame and lens assembly such that said CCD array is precisely aligned relative to said lens.

* * * * *